US007360170B1

(12) United States Patent  (10) Patent No.: US 7,360,170 B1
Giormov et al.  (45) Date of Patent: Apr. 15, 2008

(54) GRAPHICAL USER INTERFACE AND BACKGROUND SEARCH METHODOLOGY FOR CREATING REFERENCES BETWEEN SOFTWARE COMPONENTS

(75) Inventors: Dimitar T. Giormov, Plovdiv (BG); Anton G. Georgiev, Montana (BG); Denica Evtimova, Sofia (BG)

(73) Assignee: SAP AG, Walldorf (DE)

( * ) Notice: Subject to any disclaimer, the term of this patent is extended or adjusted under 35 U.S.C. 154(b) by 617 days.

(21) Appl. No.: 10/836,157

(22) Filed: Apr. 29, 2004

(51) Int. Cl.
*G06F 17/00* (2006.01)
(52) U.S. Cl. ............... 715/804; 715/805; 715/853; 717/101; 717/120
(58) Field of Classification Search ........... 715/804, 715/805, 853–855; 717/120, 101, 118, 100
See application file for complete search history.

(56) References Cited

U.S. PATENT DOCUMENTS

| 5,544,360 | A | | 8/1996 | Lewak et al. |
| 5,966,702 | A | * | 10/1999 | Fresko et al. ............ 707/1 |
| 6,282,698 | B1 | | 8/2001 | Baker et al. |
| 6,772,408 | B1 | * | 8/2004 | Velonis et al. .......... 717/100 |
| 6,836,889 | B1 | * | 12/2004 | Chan et al. ............. 719/310 |
| 2004/0015783 | A1 | * | 1/2004 | Lennon et al. .......... 715/523 |
| 2004/0015856 | A1 | * | 1/2004 | Goward et al. .......... 717/120 |
| 2005/0166189 | A1 | | 7/2005 | Ma |

OTHER PUBLICATIONS

Inprise Corporation, Enterprise JavaBeans Programmer's Guide, chapter 7, pp. 91-150, Version 4.5, copyright 2000, 2001.*
User's Guide iPlant Application Server Integration for VisualCafe, Nov. 2000.*
Faiz Arni and Andrew Pharoah, Commercial Component Creation (EJB 2.0) Enterprise JavaBeans Components Technology Based Components, Apr. 5, 2001.*
Grundy J., computer Science Conference, ACSC 2000, 23rd Australasian, pp. 95-102, 2000.
Flanagan, D., Java Examples in a Nutshell, O'Reilly, pp. 20 and 153, 1997.
Dimitar T. Giormov, et al., "A Graphical User Interface With A Background Class Loading Event System", U.S. Appl. No. 10/835,750, filed Apr. 29, 2004. Background, pp. 2-6, copy of Figure 1.

* cited by examiner

*Primary Examiner*—Tadesse Hailu
(74) *Attorney, Agent, or Firm*—Blakely, Sokoloff, Taylor & Zafman LLP (57) ABSTRACT

According to one aspect of the invention a graphical user interface is provided. The graphical user interface includes a window displaying a first item and a menu listing a second item. Selection of the first item within the window and the second item in the menu helps to define a reference created between the first item and a target software component. The first item may be a source software component, a page, or a servlet. The second item may be the target software component or an interface to the target software component. The graphical user interface may also include a second menu listing the interface to the target software component. The source and target software components may be session or entity beans. The interface may be a remote, remote home, local, or local home interface.

24 Claims, 12 Drawing Sheets

GRAPHICAL USER INTERFACE AND BACKGROUND SEARCH METHODOLOGY FOR CREATING REFERENCES BETWEEN SOFTWARE COMPONENTS

BACKGROUND OF THE INVENTION

1). Field of the Invention

This invention relates to a graphical user interface, in particular, to a graphical user interface and background methodology for creating references between software components.

2). Discussion of Related Art

In a rudimentary form, many software applications developed in component based environments consist of a number of granules of software, known as "components" or "component instances," (e.g., session beans, entity beans, etc.) and other items such as web pages and servlets. Each component is a small building block of the larger software application. When enough of the components are combined, the software acquires a particular method or functionality. Some examples of component based architectures include Java Beans (JB), Enterprise Java Beans (EJB), Common Object Request Broker Architecture (CORBA), Component Object Model (COM), Distributed Component Object Model (DCOM) and derivatives there from.

The functional granularity offered by a plurality of different components provides a platform for developing a multitude of more comprehensive tasks. For example, a business application that graphically presents the results of calculations made to an individual's financial records (e.g., amortization of interest payments, growth in income, etc.) may be created by logically stringing together: 1) an instance of a first component that retrieves an individual's financial records from a database; 2) an instance of a second component that performs calculations upon financial records; and, 3) an instance of a third component that graphically presents financial information.

Moreover, within the same environment, another business application that only graphically presents an individual's existing financial records may be created by logically stringing together: 1) another instance of the first component mentioned just above; and, 2) another instance of the third component mentioned above. That is, different instances of the same component may be used to construct different applications. The number of components within a particular environment and the specific function(s) of each of the components within the environment are determined by the developers of the environment.

Components may also be created to represent separate instances of persistent data (e.g., a first component that represents a first row of database information, a second component that represents a second row of database information, etc.) or to build textual pages (e.g., web pages) from which the execution of more complex background methods are triggered. A servlet is one type of component used to build a textual page.

Figure 1A:
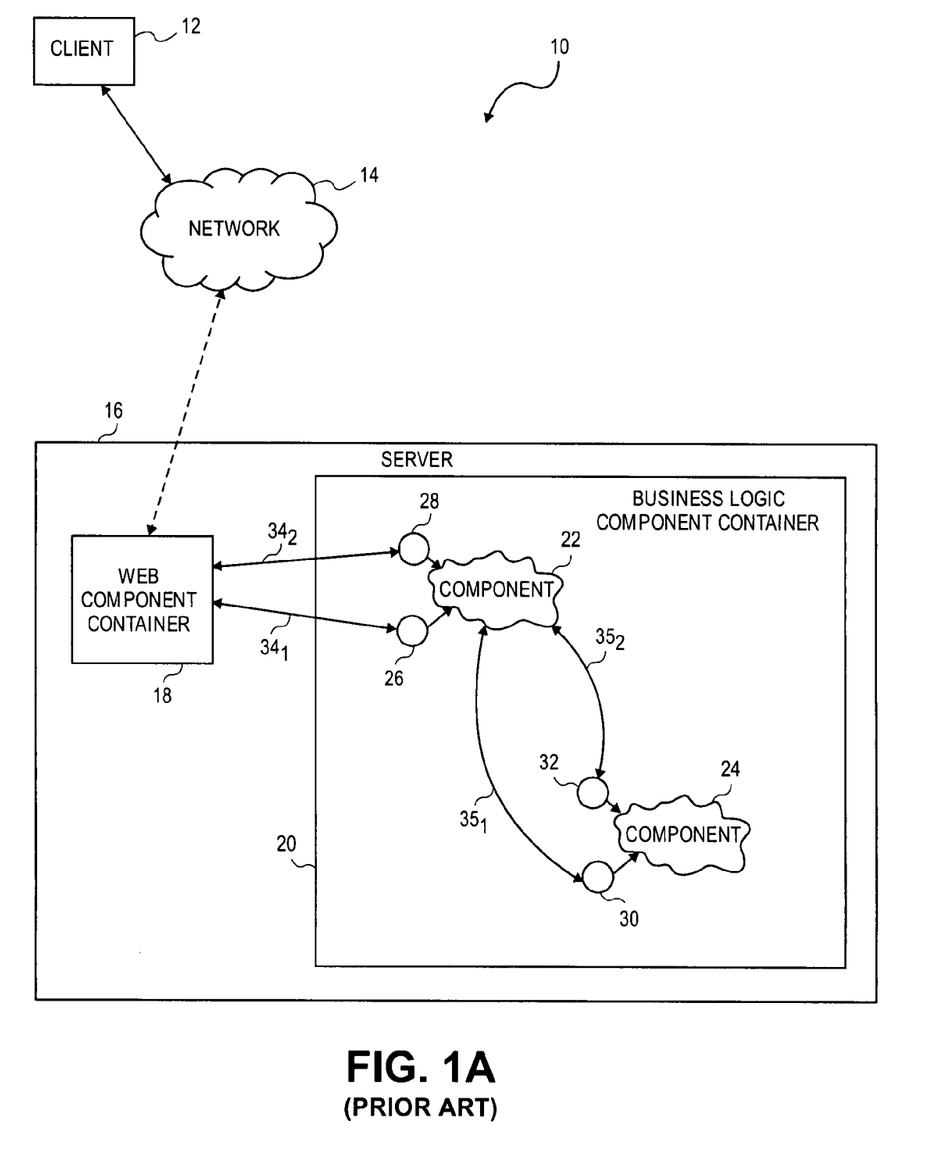
FIG. 1A illustrates a prior art computing system network.

FIG. 1A illustrates a computing system network 10 including a client 12, a network 14, and a server 16. The server 16 contains a web component container 18 and a business logic component container 20 that includes components used to implement complex business logic methods. The business logic component container 20 includes multiple business logic components 22 and 24 (e.g. entity and session "beans" in the case of a Java environment), and although not illustrated it should be understood that the web component container 18 includes source files for other items, such as web pages and servlets.

The web component container 18 may contain components from which web pages or other textual files (e.g., servlets) used for invoking an application's business logic method components are constructed. As illustrated, the user has accessed the web component container 18 within the server 16 and depending on the particular software application being used, the user may need to access one or more of the business logic components 22 and 24 within the business logic component container 20, as often the source files within a business application call upon or use other source files.

At least in a Java environment, "deployment descriptors" are used, among other things, to describe relationships between separate items of software. For example, a deployment descriptor can be used to facilitate the interaction between different components so that the components themselves need not be changed to call upon or use other components. These deployment descriptors would include what are known as "references." The references can indicate, for example, how one component will interact with another component using one or more interfaces of the other component.

According to various component based architectures, components have interfaces to which the references are made. For example, in an Enterprise Java Bean (EJB) environment, there are four interfaces that a reference can identify to access a bean: a remote interface 26, a remote home (or home) interface 28, a local interface 30, and a local home interface 32 as illustrated in FIG. 1A. When two components (which in the case of EJB are two "beans") from different containers are "connected" by a reference, the remote and remote home interfaces are used. However, when two components from the same container are referenced, the local and local home interfaces are used.

The remote home and local home interfaces are used for simple functions such as finding and deleting its constituent component. The remote and local interfaces are used to invoke the substantive methods of its particular component. In an EJB environment, the client 12 is not able to communicate with the bean instance 22 and 24 directly (i.e., is only able to use the bean instance 22 and 24 through interfaces 26, 28, 30, and 32); and, each bean instance 22 and 24 has only one home interface but is capable of having multiple remote interfaces (e.g., one remote interface for each separate client that is engaged in a communication session with).

As illustrated in FIG. 1A, component 22 is being accessed by an item from within the web container 18, therefore, the remote home 28 and remote 26 interfaces of component 22 are being used by references $34_1$ and $34_2$ to access component 22. On the other hand, component 24 is being accessed by component 22, which is also in the business logic component container 20, therefore, the local home 32 and local 30 interfaces are being used by reference $35_1$ and $35_2$ to access component 24.

Organizations that create business applications use programs that are known as "deployment" or "deploy" tools to deploy the business applications from the component source files to the particular server that is going to utilize the applications.

Figure 1B:
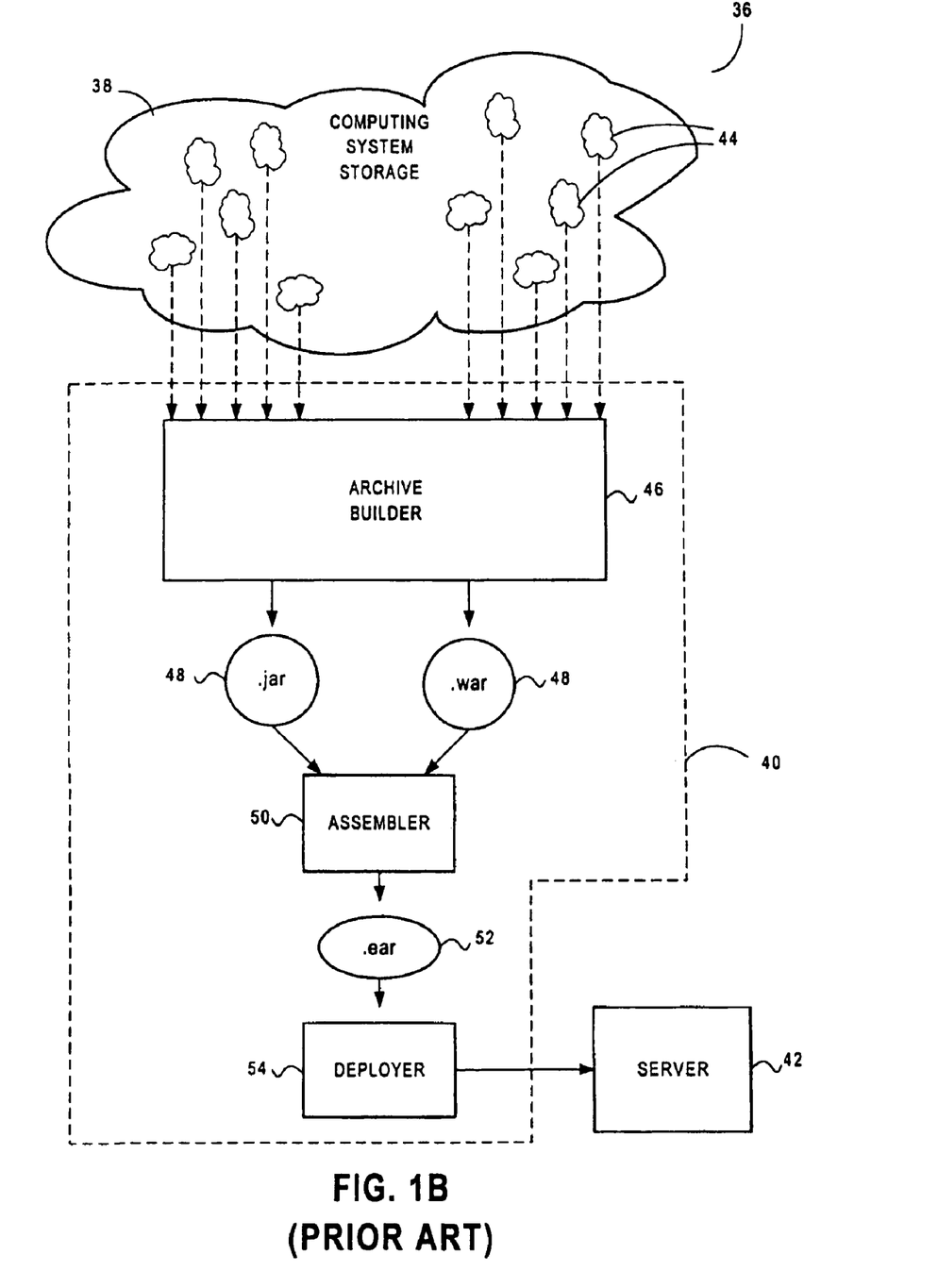
FIG. 1B illustrates a prior art software deployment environment.

The desired component source files are first tagged as the sources that are to be combined into the final business application. FIG. 1B illustrates a deployment environment 36 including a storage facility 38 of a computing system (e.g., a hard drive), a deployment tool 40, and a server 42 to receive deployed files. The computing system storage 38, which may actually comprise multiple computing subsystems, has multiple source files 44. In a Java environment, a portion of the deployment tool known as an "archive builder" 46 copies the source files 44 from the computer system storage 38 and compresses them into archive files 48 (e.g., a ".jar" file for Java beans, a ".war" file for Java web components, etc.). Another portion of the deployment tool 40, the "assembler," 50 may then combine different archive files 48 into an enterprise archive file 52 (e.g., an ".ear" file). Finally, the "deployer," 54 another portion of the deployment tool 40, sends the enterprise archive file 52 to the server 42 onto which the business application will be loaded. The server 42 "unpacks" the enterprise archive file 52 and loads the components 44.

Additionally, before the business application can be deployed to the destination server 42, the proper references between software components must be established. According to prior art approaches, in order for the archive builder 46 to create appropriate references between source files, a software engineer had to manual type the name or address of each interface into the deployment tool, which recently have begun to utilize GUIs (Graphical User Interfaces) to facilitate the process of deploying business applications.

Figure 2:
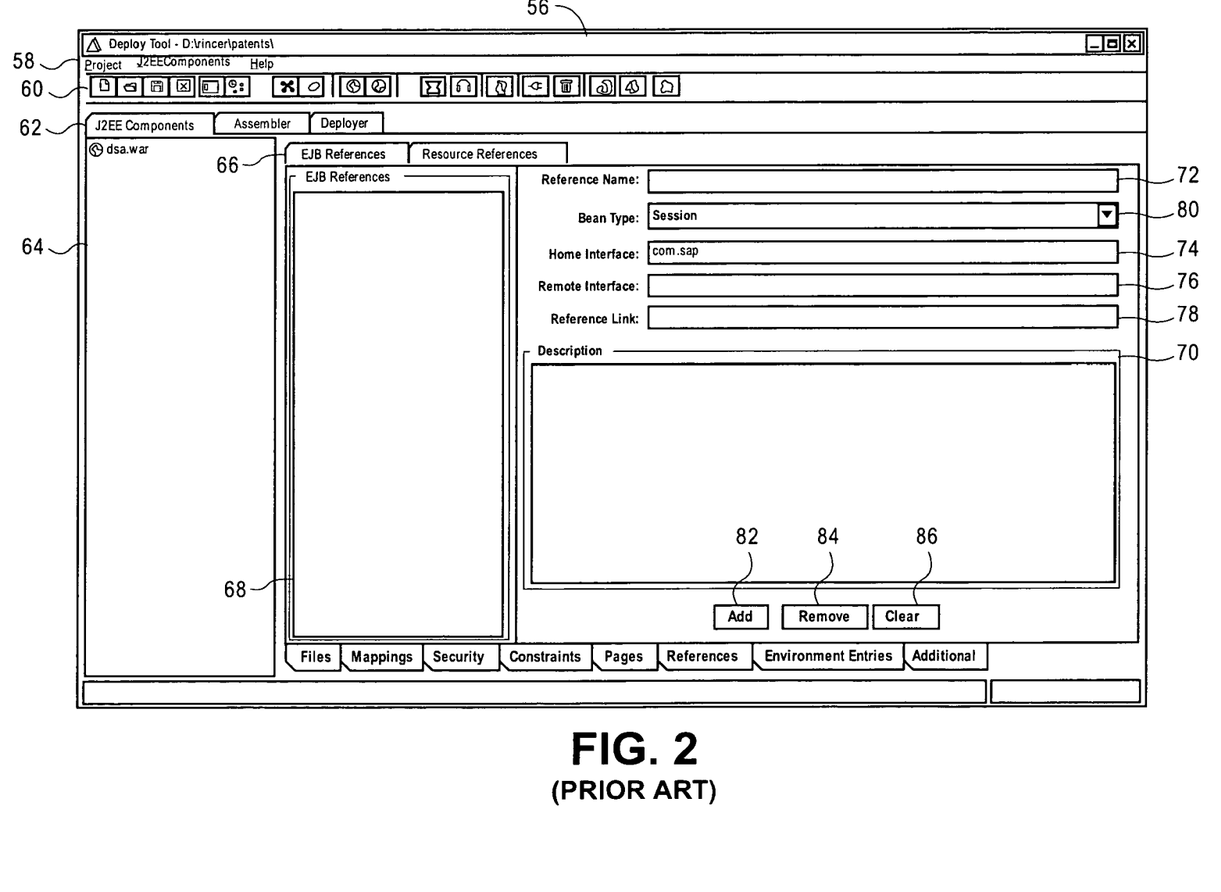
FIG. 2 illustrates a prior art graphical user interface.

FIG. 2 illustrates a prior art GUI 56 for creating references between component source files. The GUI 56 includes utility pull down menus 58, utility buttons 60, and first level tabs 62.

Within the displayed first level tab 62 is a component window 64 and two second level tabs 66, the first of which is displayed and includes a reference window 68 and a reference information window 70. The reference information window 70 includes multiple fields: a reference name field 72, a home interface field 74, a remote interface field 76, and a reference link field 78. The reference information window 70 also includes a component type indicator 80, an add button 82, a remove button 84, and a clear button 86.

In use, from the component source files, the components of a project are listed within the component window 64. The user selects the component from which the reference will be made (i.e., the source component) from the component window 64. In order to create a proper reference, the user must then manually type the name of the component to which the reference will be made (i.e., the target component) into the reference link field 78. The user must also manually type the type of interfaces being referred to into either the home 74 and remote 76 interface fields and type the name of the reference into the reference name field 72 before clicking the add button 82 to finish the reference, which is then displayed in the reference window 68. The reference is then instantiated into a deployment descriptor.

The names, or addresses, of the interfaces and the components themselves can be very long and confusing. Properly typing the required information into the appropriate field is very time consuming and arduous, even for an experienced user. Mistakes are often made in this process, which results in the business application not working properly.

It is important to emphasize that although alternative component designs may exist that depart from existing EJB specifications in various respects, it is possible that environments that use such alternative component designs can take advantage of the teachings being described herein.

SUMMARY OF THE INVENTION

According to one aspect of the invention a graphical user interface is provided. The graphical user interface includes a window displaying a first item and a menu listing a second item. Selection of the first item within the window and the second item in the menu helps to define a reference created between the first item and a target software component. The first item may be a source software component, a page, or a servlet. The second item may be the target software component or an interface to the target software component. The graphical user interface may also include a second menu listing the interface to the target software component. The source and target software components may be session or entity beans. The interface may be a remote, remote home, local, or local home interface.

BRIEF DESCRIPTION OF THE DRAWINGS

The invention is described by way of example with reference to the accompanying drawings, wherein:

FIGS. 3A-4C illustrate a graphical user interface according to an embodiment of the present invention;

DETAILED DESCRIPTION OF THE INVENTION

FIG. 3A through FIG. 4C illustrate an improved graphical user interface (GUI). The graphical user interface includes a window displaying a first item and a menu listing a second item. Selection of the first item within the window and the second item in the menu helps to define a reference created between the first item and a target software component. The first item may be a source software component. The second item may be the target software component or an interface to the target software component. The graphical user interface may also include a second menu listing the interface to the target software component. The source and target software components may be session, entity beans, servlets etc. The interface may be a remote, remote home, local, or local home interface.

Figure 3A:
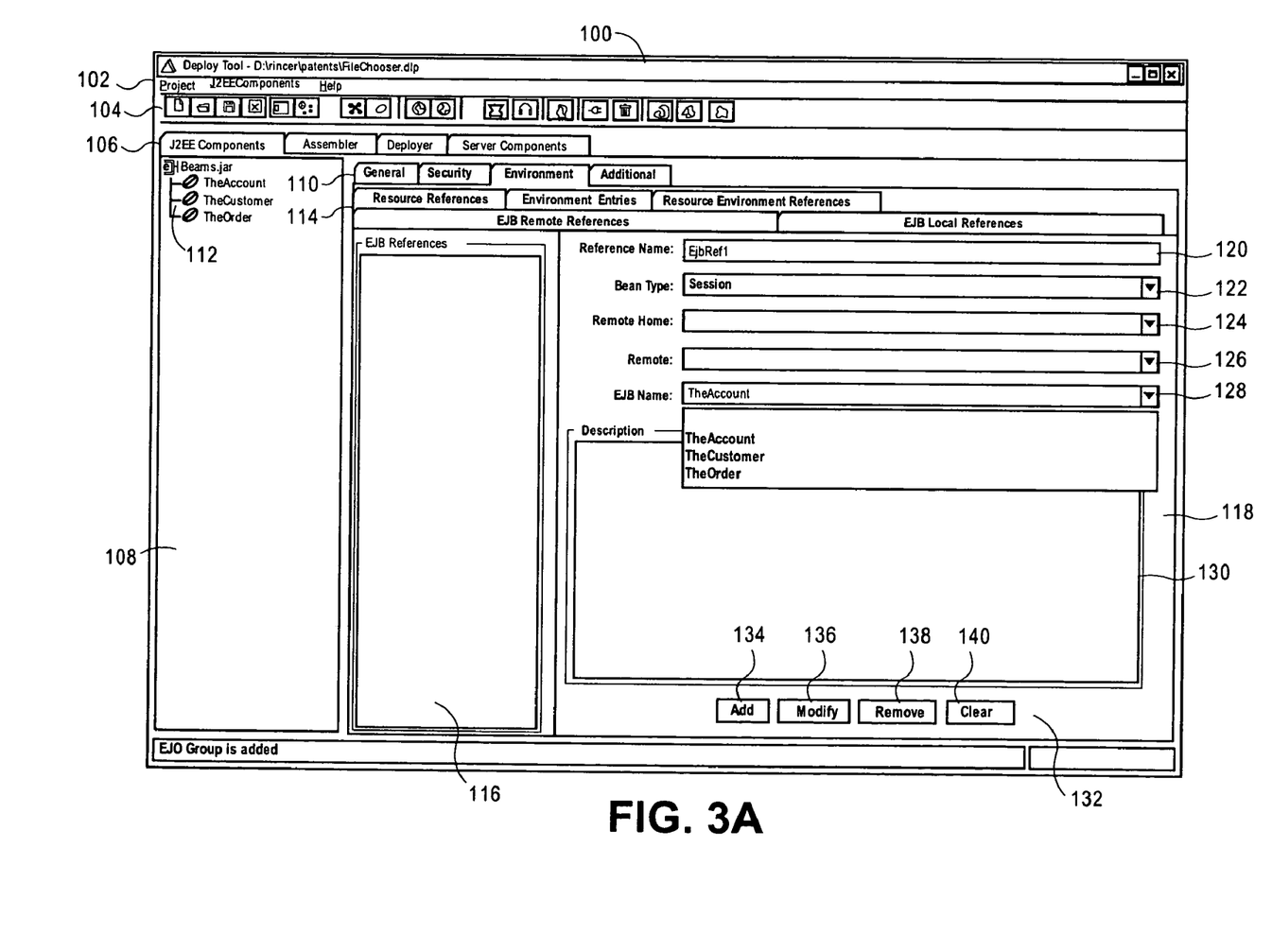

As illustrated in FIG. 3A, the GUI 100 includes utility pull down menus 102, utility buttons 104, and first level tabs 106. The utility pull down menus 102 are displayed at an upper portion of the GUI 100 and include three pull down menus: a Project pull down menu, a J2EE Components pull down menu, and a Help pull down menu. Although not illustrated, it should be understood that each of the utility pull down menus 102 include various items which may be used for performing various functions of the software application that is utilizing the GUI 100 (e.g., creating a new project, saving the current project, deleting a project, etc.).

The utility buttons 104 are arranged horizontally below the utility pull down menus 102 and include multiple buttons for performing various functions of the software application. The various functions performed by the utility buttons 104 may be to support some of the functions contained within the utility pull down menus 102 (e.g., opening a file to create a new project, opening a file to save the current project, etc.).

The first level tabs 106 are grouped in a horizontal row just below the utility buttons 104 and include a J2EE Components tab, an Assembler tab, a Deployer tab, and a Server Components tab. In the example illustrated in FIG. 3A, the J2EE Components tab is selected, or opened, and the contents thereof are displayed in the remainder of the GUI 100 below the first level tabs 106.

The J2EE Components tab includes a component window 108 and second level tabs 110. The component window 108 stretches along a side edge of the GUI 100 and extends the entire height of the J2EE Components tab. As illustrated the component window 108 includes a list of J2EE components 112 within a .jar file (e.g., session beans and/or entity beans). In the example illustrated, an archive file, "Beans.jar," is listed in the components window 112, along with three beans, "The Account," "The Customer," and "The Order," that are contained in the archive file Beans.jar. The beans shown in FIGS. 3A-4C are each a type of component.

The second level tabs 110 occupy the remainder of the space within the J2EE Components tab. In the example illustrated, there are four second level tabs (General, Security, Environment, and Additional). As illustrated, the Environment tab is selected.

The Environment tab includes five third level tabs 114 (Resource Reference, Environment Entries, Resource Environment References, EJB Remote References, and EJB Local References). As illustrated, the EJB Remote References tab is selected. The EJB Remote References tab is used to automatically create remote references (as will be described immediately below). The EJB Local References tab is used to automatically create local references.

The EJB Remote References tab includes a reference window 116 and a reference information window 118, which are located side by side within the EJB Remote References tab. Although as illustrated the references window 116 is empty, the reference window 116 is used to display a list of the references that have been created between various components.

The reference information window 118 includes a reference name field 120, a component type selector 122, a remote home pull down menu 124, a remote pull down menu 126, a target component pull down menu 128, a description window 130, and reference buttons 132. These items are displayed within the reference information window 118 from top to bottom as listed above, with the reference name field 120 being at the top and the reference buttons 132 being at the bottom.

There are four reference buttons 132 including an add button 134, a modify button 136, a remove button 138, and a clear button 140.

Figure 3B:
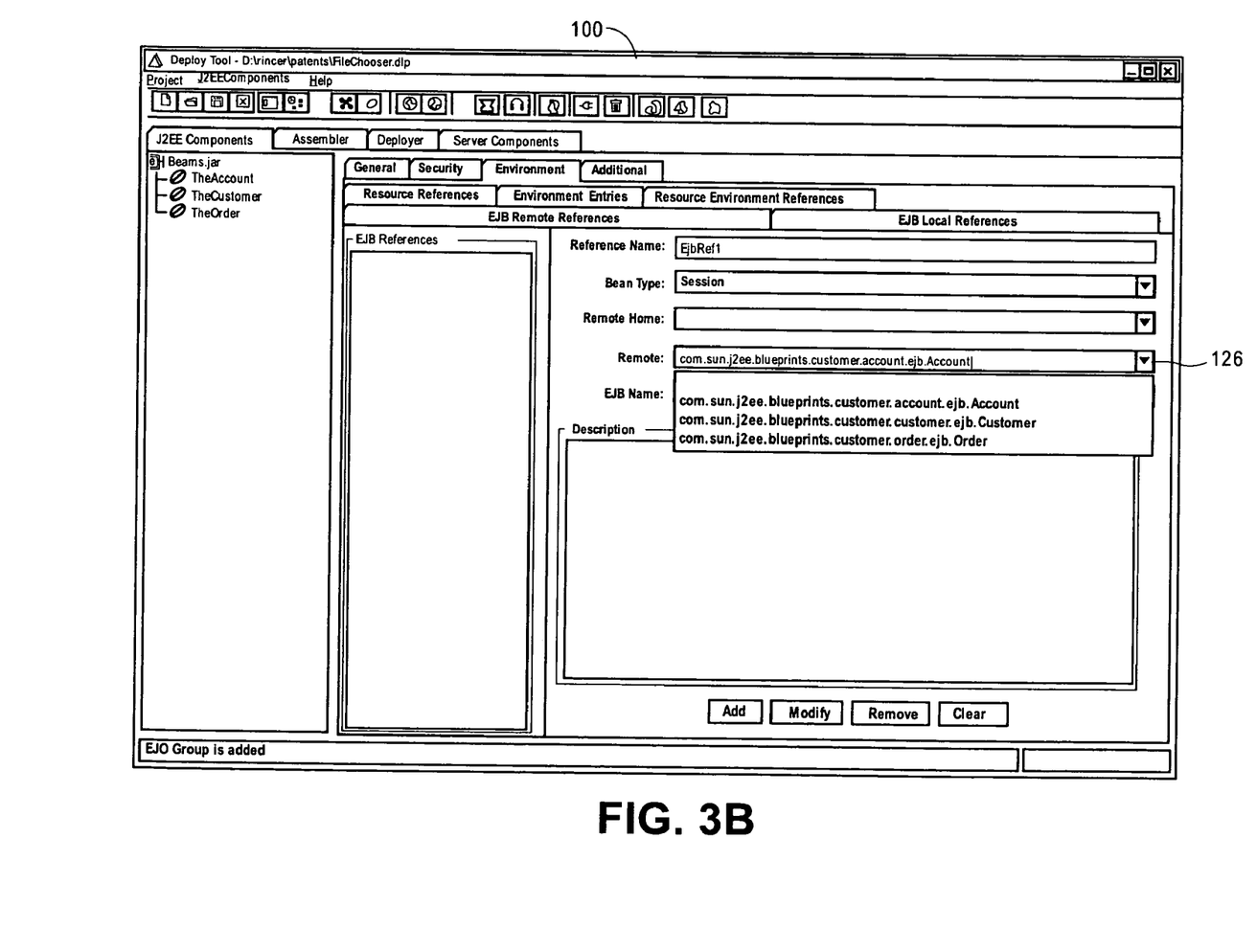
Figure 3C:
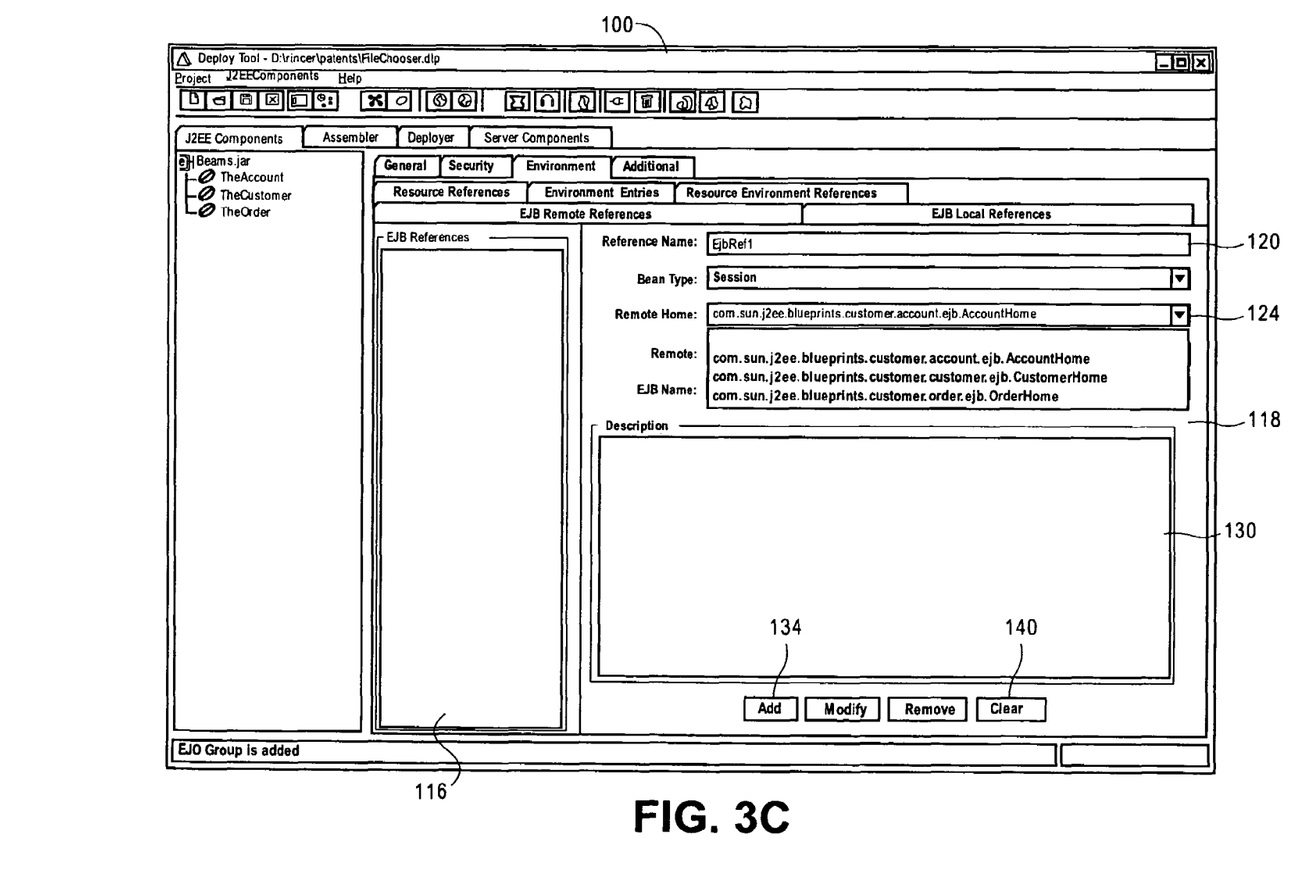

In use, a user creates references between components using the GUI 100. FIGS. 3A-3C illustrate a reference being created between two beans. As mentioned above, all of the components 112 within the current project are displayed within the component window 108.

Referring specifically to FIG. 3A, the user first selects the component from which he or she wishes to make the reference by, for example, "clicking" or "double-clicking" the component within the component window 108 with a user interface device, such as a mouse, and a cursor. This first component may be referred to as the "source component." In the example illustrated in FIG. 3A, the user has selected The Account as the bean from which the reference is to be made.

The user may then, if he or she desires, name the reference that is being created by typing a name into the reference name field 120. In the example illustrated, the reference has been given the name "EjbRef1." It should be understood that the reference does not need to be given a name at this point in the creation of the reference. However, a name should be given to the reference before the completion of the reference.

Still referring to FIG. 3A, the user then selects which component he or she wishes to make the reference to, in the example illustrated, by activating the target component pull down menu 128. In an embodiment, once the source is selected 112, the software used to present the graphical user interface invokes background software that searches through the deployment descriptors of the components within an appropriate region of the overall project (e.g., one or more applications, one or more archive files, etc.). Those deployment descriptors identifying potential target components are used to generate the names of the potential target components on the GUI. Thus, as seen in FIG. 3A, once the target component pull down menu 128 is activated, a list of all of the components within the "Beans.jar" archive file appears. More details concerning the background search software is provided in more detail below with respect to FIGS. 5A and 5B.

The user then selects one of the components in window 128, and this component may be referred to as the "target component." In the example illustrated, the user has selected The Account as the bean to which the reference is to be made. Although the example illustrated shows the source component and the target component as having the same names, it should be understood that such would not ordinarily be the case as normally the two components of a reference are different components. The candidate target components that are listed in the target component pull down menu 128 are filtered by the background searching software through selection of the component type selector 122. Here, the component type selector 122 allows selection of "session" or "entity." If "session" is selected (as is the case in FIG. 3A), all session components in the project displayed (note that in this example, all components in the project are session components).

The user then selects the remote interface that will be utilized by the reference that is being created. Referring to FIG. 3B, the user activates the remote pull down menu 126. Once the remote pull down menu 126 is activated, the background search software helps to generate a list of the names of all remote interfaces that exist in a project region within the remote pull down menu 126. It should be understood that the searching may also begin when the component is selected from the component window 108. The user then selects one of the remote interfaces by, for example, simply clicking the interface with the cursor. In this case, note that the user chose the interface for the target component. Importantly, the user does not need to manually type the description of the remote interface into the GUI 100. Rather, the user needs only to select one of the remote interfaces listed within the remote pull down menu 126. After the selection has been made, the list of remote interfaces disappears and only the selected remote interface is displayed.

FIG. 3C shows an alternate reference to that which is created in FIG. 3B. That is, the user selects the remote home interface rather than the remote interface. Referring to FIG. 3C, the user activates the remote home pull down menu 124. Once the remote home pull down menu 124 is activated, the background search software helps to generate a list of all remote home interfaces in a project region within the remote home pull down menu 124. The user then selects one of the remote home interfaces (again, the interface that corresponds to the target component) by, for example, simply clicking the interface with the cursor. The user does not need to manually type the description of the remote home interface into the GUI 100. Rather, the user needs only to select one of the remote home interfaces listed within the remote home pull down menu 124. After the selection has been made, the list of remote interfaces disappears and only the selected remote interface is displayed.

If the user wishes, he or she may manually type other information or comments into the description window 130 before the reference is created.

After all of the above information is entered into the reference information window 118, the user completes the creation of the reference by clicking the add button 134. Those of ordinary skill can readily configure a reference with the information observed in FIGS. 3B and 3C. Although not illustrated, once the reference is created, the name of the reference, as listed in the reference name field 120, is displayed in the reference window 116. If the user wishes to clear all of the information from the reference information window 118, he or she may at any time click the clear button 140 and all information in the reference information window 118 will be erased. Note that if the components of the project were in the same container, a similar process to that just described could have been performed with the contents of the EJB Local References tab. The EJB Local References tab displays names for local home and local interfaces but otherwise works identically as described with respect to FIGS. 3A-3C.

Figure 4A:
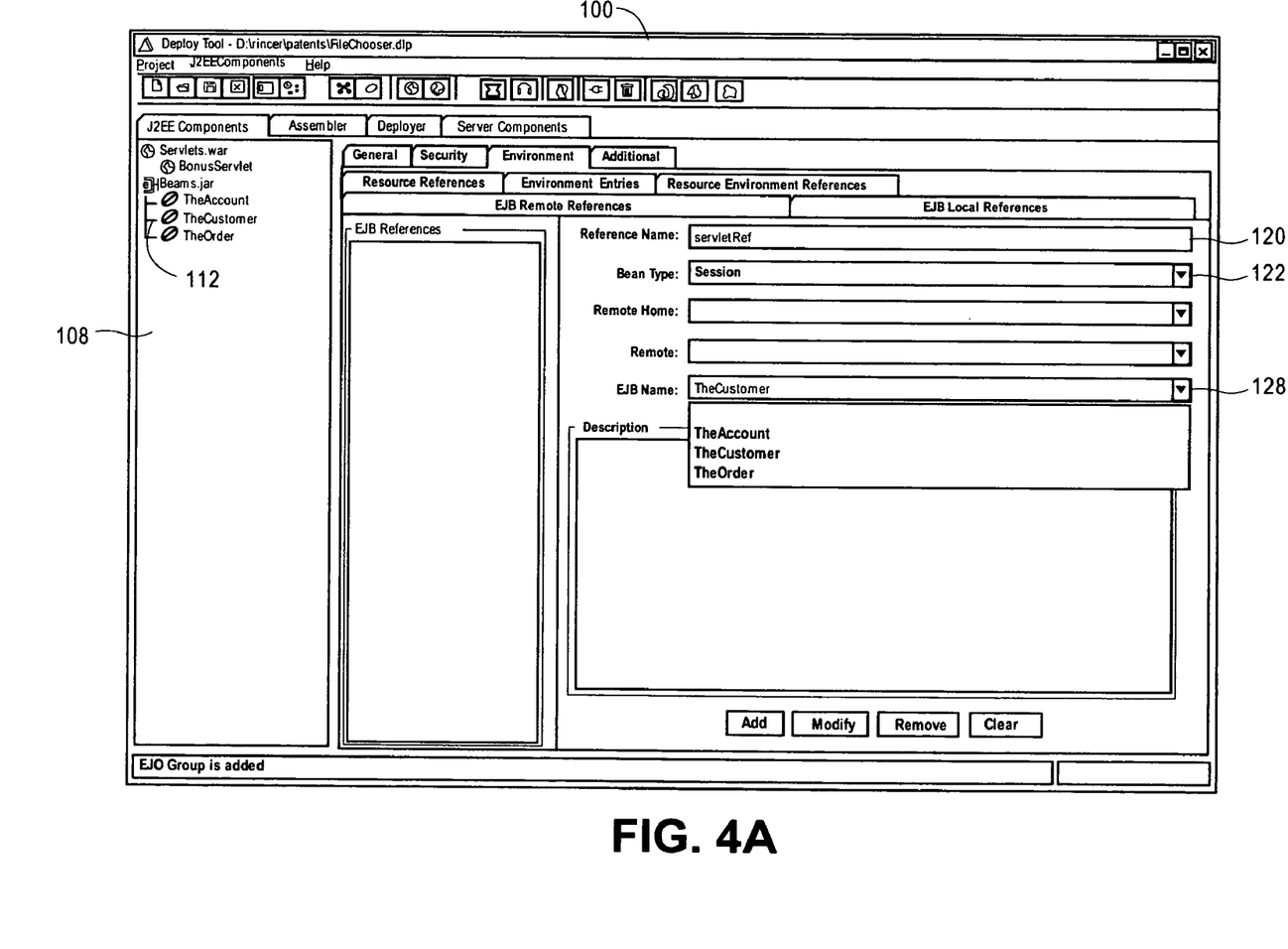
Figure 4B:
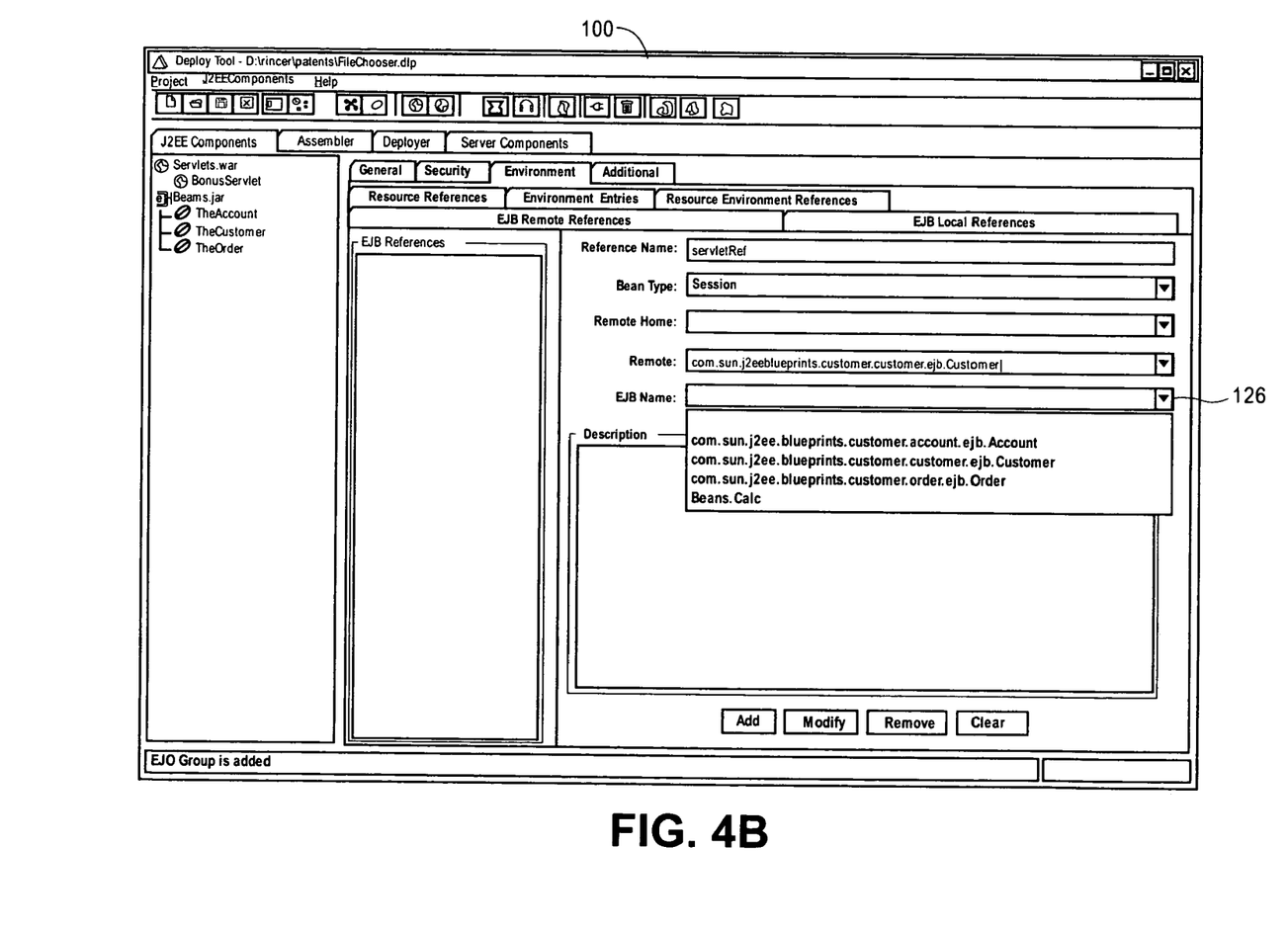
Figure 4C:
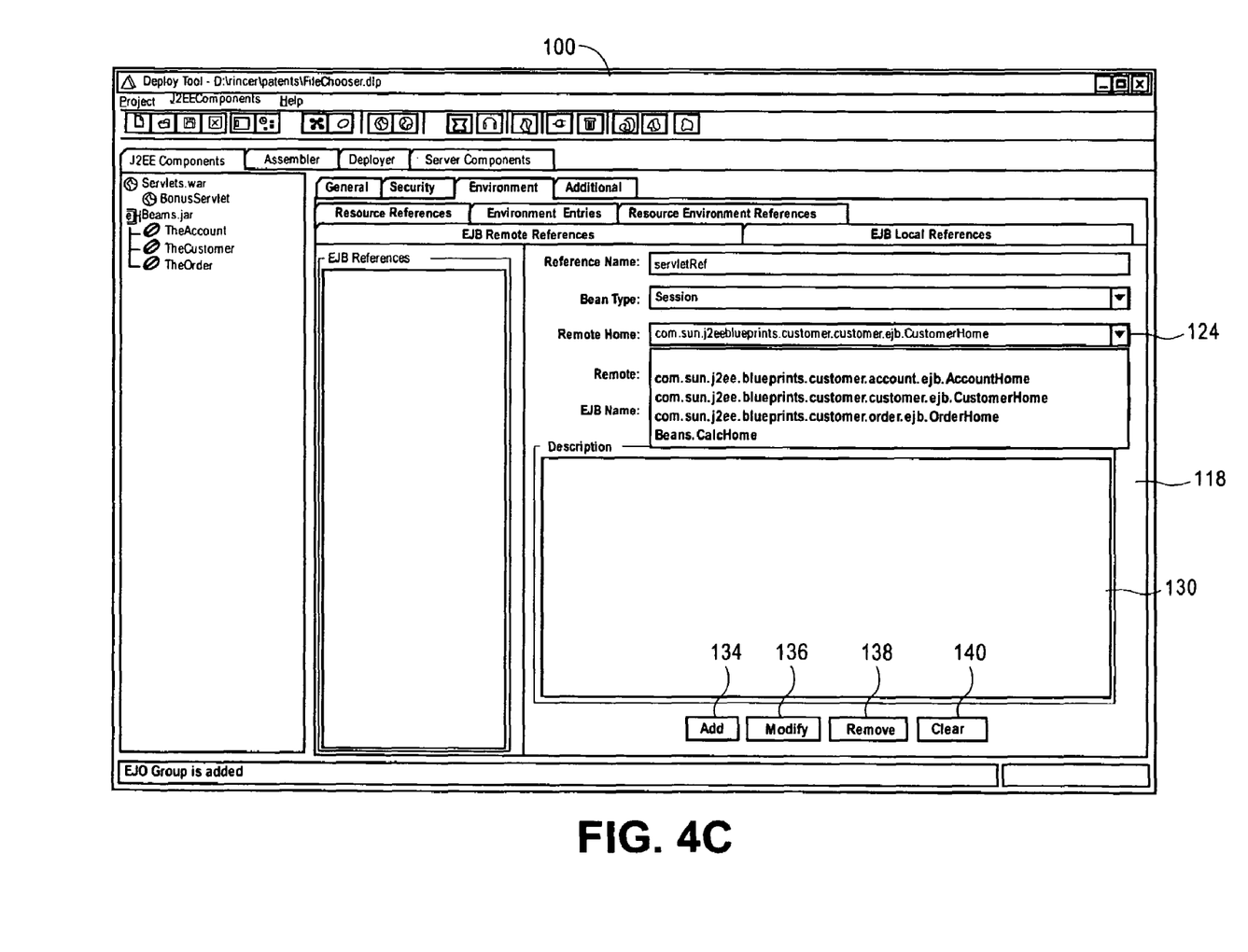

FIGS. 4A-4C illustrate a reference being created between a servlet and a bean in a manner similar to that illustrated in FIGS. 3A-3C. All of the components and servlets 112 within a region of a project are displayed within the component window 108. In an alternate view, web pages (e.g., a JSP page) that serve as a reference source are also displayed in the component window 108.

Referring specifically to FIG. 4A, the user first selects the source component of the reference from the target component pull down menu 128. In the example illustrated in FIG. 4A, the user has selected BonusServlet as the servlet from which the reference is to be made.

The user may then, if he or she desires, name the reference that is being created by typing a name into the reference name field 120. As illustrated in FIG. 4A, the reference has been given the name "servletRef." Again, it should be understood that the reference does not need to be given a name at this point in the creation of the reference. However, a name should be given to the reference before the completion of the reference.

Still referring to FIG. 4A, the user then selects the target component. As in FIG. 3A, the component type filter 122 is selected and when the target component pull down menu 128 is activated the background search software helps to generate a list of all of the components of the type selected in the component type selector 122 in the window 128. In the example illustrated in FIG. 4A, the user has selected The Customer bean as the target component.

In FIG. 4B, the user then selects a remote interface that will be utilized by the reference that is being created. Referring to FIG. 4B, the user activates the remote pull down menu 126. The background search software helps generate the list of remote interfaces in a region of the project within menu 126 and selects the remote interface of the target component. Again, the user does not need to manually type the description of the remote interface into the GUI 100. Rather, the user needs only to select the remote interface of the target component listed within the remote pull down menu 126. After the selection has been made, the list of remote interfaces disappears and only the selected remote interface is displayed.

In contrast to FIG. 4B, in FIG. 4C, the user selects a remote home interface for the reference that is being created. Referring to FIG. 4C, the user activates the remote home pull down menu 124 and the background search software helps to generate a list of the remote home interfaces within menu 124. The user then selects the remote home interface of the target component. The user does not need to manually type the description of the remote home interface into the GUI 100. Rather, the user needs only to select the remote home interface of the target component listed within the remote home pull down menu 124. After the selection has been made, the list of remote interfaces disappears and only the selected remote interface is displayed.

If the user wishes, he or she may manually type other information or comments into the description window 130 before the reference is created.

After all of the above information is entered into the reference information window 118, the user completes the creation of the reference by clicking the add button 134. Although not illustrated, once the reference is created, the name of the reference, as listed in the reference name field 120, is displayed in the reference window 116. If the user wishes to clear all of the information from the reference information window 118, he or she may at any time click the clear button 140 and all information in the reference information window 118 will be erased.

The process described above and illustrated in FIGS. 4A-4C may be repeated multiple times. At the completion of the creation of each reference, the names of each reference are listed within the reference window so that multiple references may be listed within the reference window.

Similarly to the example illustrated in FIGS. 3A-3C, if the user wishes to view the information on a particular reference that has already been created, he or she may select the reference from the reference window 116 and the information on that reference is displayed in the appropriate places within the reference information window 118. If the user wishes to modify the information, he or she may click the modify button 136 and the information may be changed. If the user wishes to remove that reference completely, he or she may click the remove button 138 and the reference is completely erased.

Figure 5A:
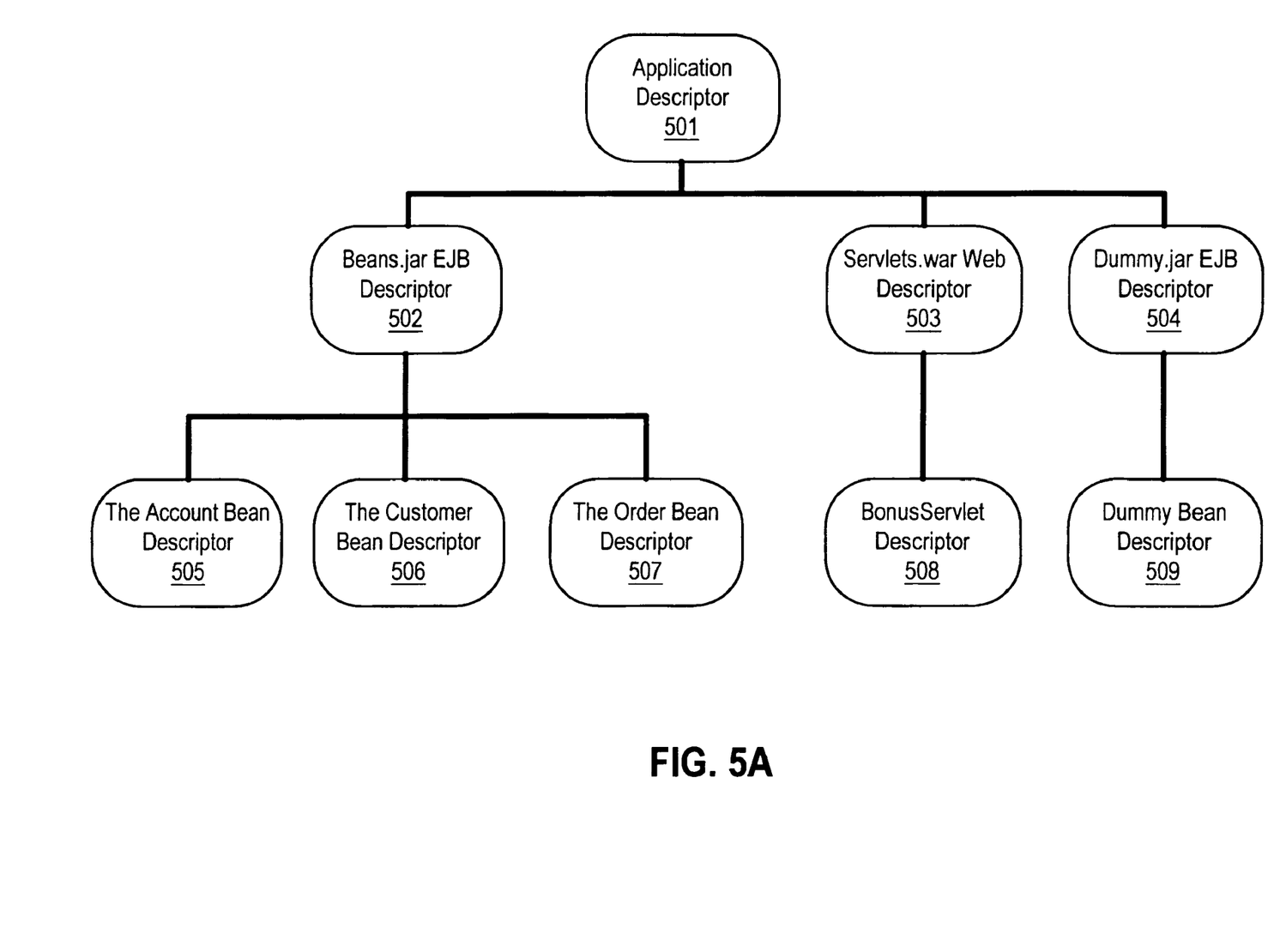
FIG. 5A shows a depiction of the organization of the deployment descriptors for a deployable application.
Figure 5B:
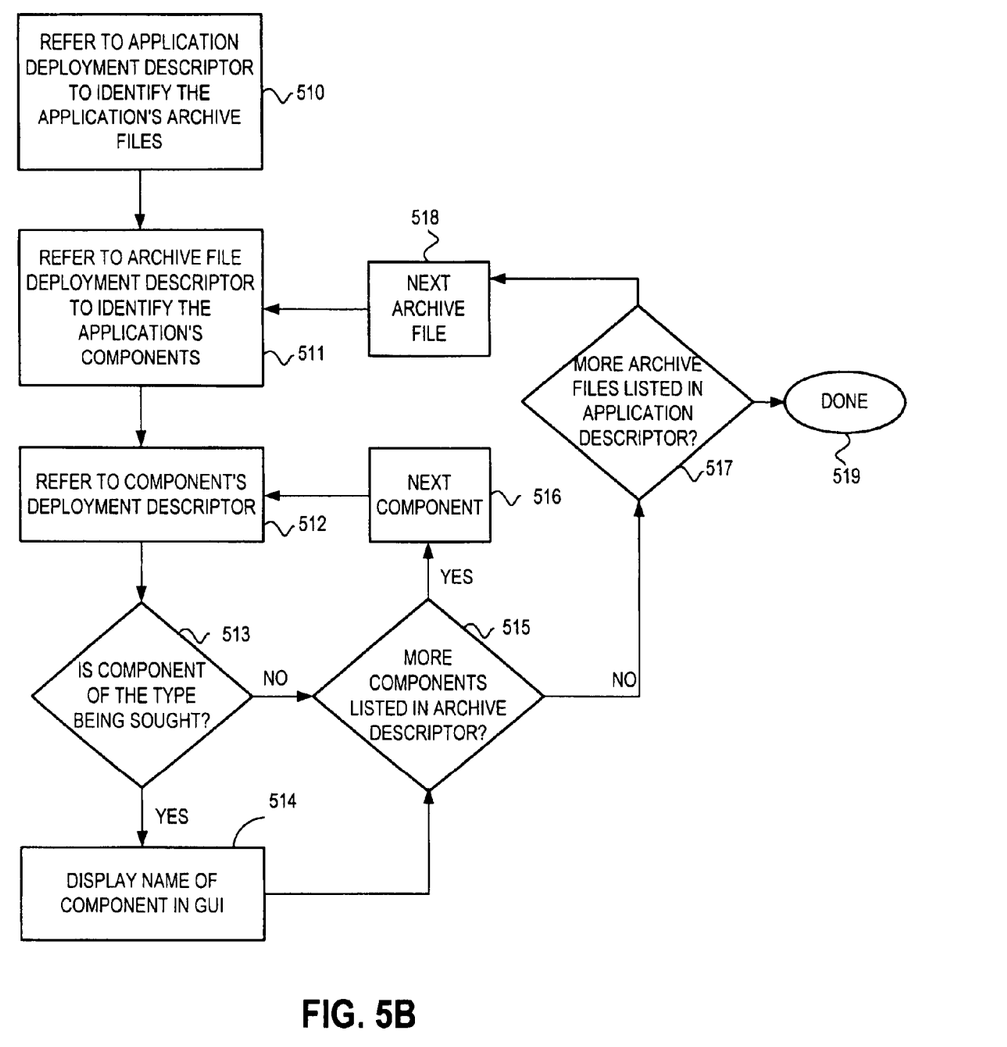
FIG. 5B shows a depiction of a background search methodology for displaying information within the GUIs of FIGS. 3A through 4C; and, FIG. 6 is a block diagram of a computing system.

FIGS. 5A and 5B relate to an embodiment of the aforementioned background searching software. FIG. 5A shows a depiction of the organization of the deployment descriptors for a deployable application that applies to the situation of FIGS. 4A through 4C. That is, if the components discussed in FIGS. 4A through 4C applied to a single application, a deployable version of the application may be implemented with its deployment descriptors being organized as observed in FIG. 5A.

The organization of the deployment descriptors for the deployable application include, at the top of the hierarchy, a first deployment descriptor 501 that identifies the application's archive files. The exemplary deployable application of FIG. 5A is assumed to have: 1) a Beans.jar file that contains the Account, Customer and Order beans; 2) a Servlets.war file that contains the BonusServlet servlet; and, 3) a Dummy.jar file that contains a Dummy bean.

Accordingly, the Beans.jar file includes a deployment descriptor 502 that identifies the Account, Customer and Order beans; the Servlets.war file includes a deployment descriptor 503 that identifies the BonusServlet servlet; and, the Dummy.jar file includes a deployment descriptor 504 that identifies the Dummy bean. The Account bean includes its own deployment descriptor 505, the Customer bean includes its own deployment descriptor 506, the Order bean includes its own deployment descriptor 507, the BonusServlet includes its own deployment descriptor 508, and the dummy bean includes its own deployment descriptor 509.

Here, it is useful to recall that the Account, Customer, Order and Dummy beans as well as the BonusServlet can be viewed as different components within a component based J2EE environment. The background search methodology referred to above, at least in one embodiment, ultimately finds the names of the appropriate components and/or appropriate interfaces from the deployment descriptors of the appropriate components within the application; and, provides these names to the GUI for display. Here, "appropriate" components and/or "appropriate" interfaces means those components and/or interfaces that are being sought by the searching methodology. For example, in the case of FIG. 4B remote interfaces are being searched for; while, in the case of FIG. 4C, remote home interfaces are being searched for.

FIG. 5B shows a search methodology that "drills down" through a deployment descriptor hierarchy (such as the deployment descriptor hierarchy of FIG. 5A) to reach component level deployment descriptors. For each reached component level deployment descriptor, if appropriate information resides therein (e.g., a name of a sought for interface type or component), it is displayed on the GUI.

According to the search methodology of FIG. 5B, an application's primary deployment descriptor (such as deployment descriptor 501 of FIG. 5A) is referred to in order to identify the application's archive files 510. In an embodiment, the GUI calls upon a "help object" which makes at least this initial reference 510 (if not all the references to deployment descriptors described below). The deployment descriptor of a first archive file (such as deployment descriptor 502 of FIG. 5A) identified in the primary deployment descriptor is then referred to 511 in order to identify the components contained by that archive file. Then, the deployment descriptor of a first component (such as deployment descriptor 505) identified in the archive deployment descriptor to see if it contains the feature being sought 513.

The particular methodology of FIG. 5B indicates that a particular component is being sought for 513 (e.g., an entity bean or a session bean). It should be noted that other features could be sought for such as a particular interface (e.g., a remote interface or a remote home interface as described above with respect to FIGS. 3B and 3C and FIGS. 4B and 4C). Here, any filters may be applied as part of inquiry 513 to further define the feature being sought for.

If the deployment descriptor contains the information being sought (e.g., the name of the component, the name of the component's remote interface, the name of the component's remote home interface, etc.) the information is displayed on the GUI 514. The deployment descriptor of each component within the archive file being analyzed is processed as described above until the deployment descriptors for all components within the archive file being analyzed have been processed 515, 516 (e.g., for the Beans.jar archive file, deployment descriptors 506 and 507 after deployment descriptor 505 has been analyzed).

The next archive file identified in the primary deployment descriptor is targeted so that the deployment descriptors for each of its components can be analyzed (e.g., the Servlet.war archive file) 517, 518. Its deployment descriptor (e.g., deployment descriptor 503) is then referred to 511 so that its components (e.g., the BonusServlet) can be identified. The deployment descriptor of each component in the current archive file is analyzed and appropriate (i.e., sought for) information is displayed in the GUI. The process repeats until the deployment descriptors of all components within all archive files have been analyzed. At the end, all appropriate information will be displayed in the GUI. The entire methodology of FIG. 5b may then be iterated over each application to be searched over within the project region.

Processes taught by the discussion above may be performed with program code such as machine-executable instructions, which cause a machine (such as a "virtual machine", general-purpose processor or special-purpose processor) to perform certain functions. Alternatively, these functions may be performed by specific hardware components that contain hardwired logic for performing the functions, or by any combination of programmed computer components and custom hardware components.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 6:
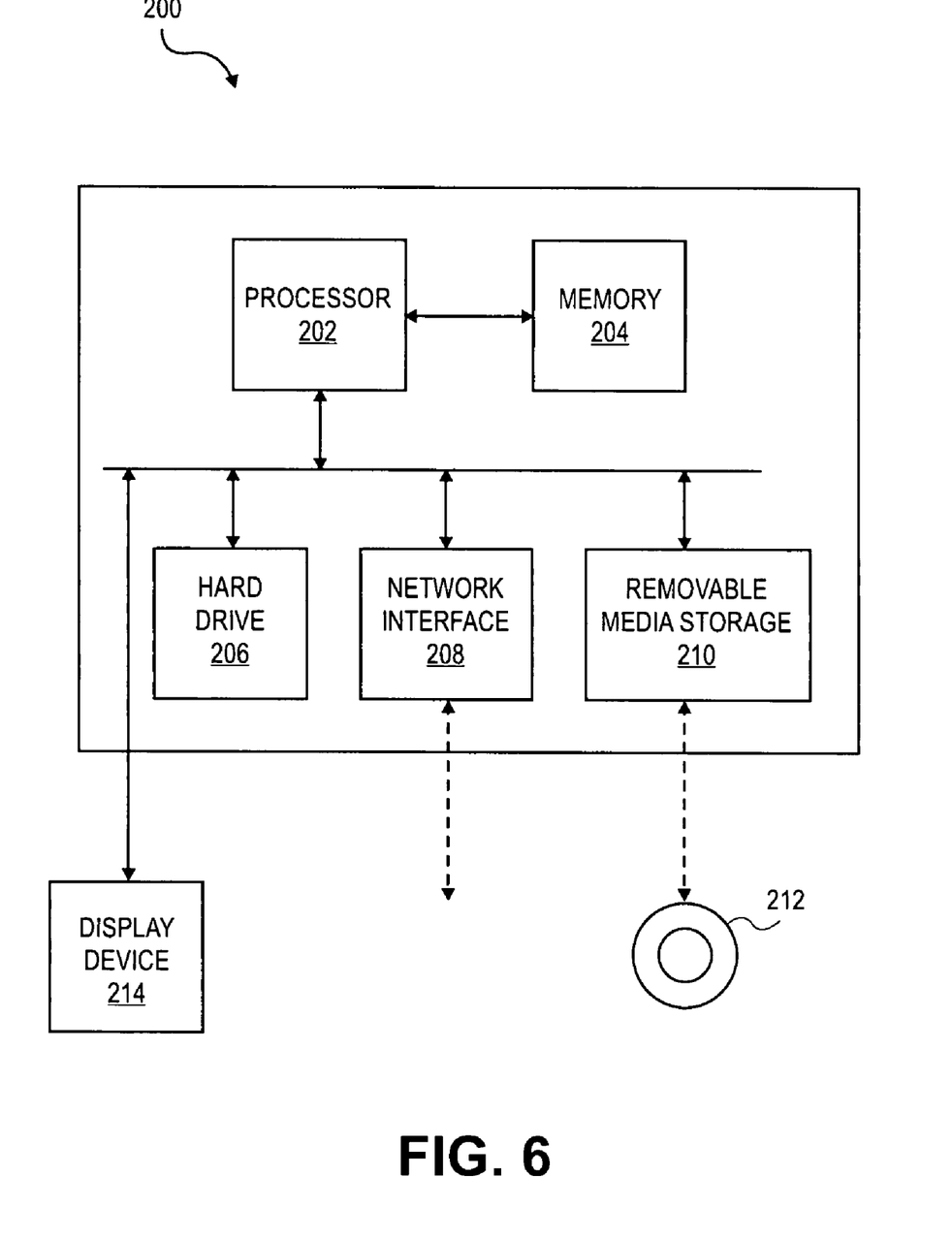

FIG. 6 is a block diagram of an example of a computing system 200 that can execute program code stored by an article of manufacture. The computing system 200 includes a processor 202, a memory 204, a hard drive 206, a network interface 208, a removable media drive 210, a CD-ROM 212, and a display device 214. It is important to recognize that the computing system of FIG. 6 is just one of various computing architectures. The applicable article of manufacture may include one or more fixed components (such as a hard disk and a memory) and/or movable components such as a CD-ROM, a compact disc, a magnetic tape, etc. In order to execute program code, typically instructions of the program code are loaded into the memory 204, such as Random Access Memory (RAM), and the processor 202, or microprocessor, then executes the instructions.

The display device 204 may be used to display the GUI described in FIGS. 3A-4C, and the computing system of FIG. 6 may be used to execute instructions in the form of software that may include the GUI and the method for navigating a directory, or file, system to select particular files. The software may also be used from multiple computing systems simultaneously.

The processes taught by the discussion above can be practiced within various software environments such as, for example, object-oriented and non-object-oriented programming environments, Java based environments (such as a Java 2 Enterprise Edition (J2EE) environment or environments defined by other releases of the Java standard, or other environments (e.g., a NET environment, a Windows/NT environment, each of which is provided by Microsoft Corporation).

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A method of creating a reference with the assistance of a graphical user interface comprising:
   reading program code from a memory and processing said program code with a processing unit to perform the following:
   displaying a window having a first item, said first item representing a part of a software application program, said part being one of the following:
   a first software component;
   a page;
   a servlet;
   in response to a user selecting a first feature on said graphical user interface that expressly identifies a particular type of software component interface, displaying a second window containing features that pertain to a reference to be created after said part is selected by said user, said reference to be directed from said selected part to a second software component through an interface of said expressly identified type;
   in response to said user identifying through at least one of said features a particular type of software component for said second software component, searching through deployment descriptors contained in an archive file to identify software components of said software component type and displaying said identified software components on said graphical user interface; and,
   after said user selects said second software component from amongst said identified and displayed software components, automatically creating said reference.

2. The method of claim 1 wherein said identified and displayed software components are displayed through a pull-down menu.

3. The method of claim 1 wherein said part and said software component are stored on a single container.

4. The method of claim 3, wherein said particular software component interface is a local interface.

5. The method of claim 1 wherein said part is stored on a first container, and said software component is stored on a second container.

6. The method of claim 5, wherein said particular type of software component interface is a remote interface.

7. The method of claim 6, wherein said part and said second software component are both Java beans.

8. The method of claim 1 further comprising after said user selects said second software component, in response to said user identifying a sub interface type of said interface type:
   loading a class file of said software component;
   searching the class file for a said sub interface type interface of said interface type; and
   if said sub interface type of said interface type is on the class file, displaying its name on said graphical user interface.

9. An article of manufacture, comprising:
   program code which, when processed by a machine, causes the machine to perform a method of creating a reference with the assistance of a graphical user interface, the method comprising:
   displaying a window having a first item, said first item representing a part of a software application program, said part being one of the following:
   a first software component;
   a page;
   a servlet;
   in response to a user selecting a first feature on said graphical user interface that expressly identifies a particular type of software component interface, displaying a second window containing features that pertain to a reference to be created, said reference to be directed from said part to a second software component through an interface of said expressly identified type;
   in response to said user identifying through at least one of said features a particular type of software component for said second software component, searching through deployment descriptors contained in an archive file to identify software components of said software component type and displaying said identified software components on said graphical user interface; and,
   after said user selects said second software component from amongst said identified and displayed software components, automatically creating said reference.

10. The article of manufacture of claim 9 wherein said identified and displayed software components are displayed through a pull-down menu.

11. The article of manufacture of claim 9 wherein said part and said software component are stored on a single container.

12. The article of manufacture of claim 11, wherein said particular software component interface is a local interface.

13. The article of manufacture of claim 9 wherein said part is stored on a first container, and said software component is stored on a second container.

14. The article of manufacture of claim 13, wherein said particular type of software component interface is a remote interface.

15. The article of manufacture of claim 14, wherein said part and said second software component are both Java beans.

16. The article of manufacture of claim 9 further comprising after said user selects said second software component, in response to said user identifying a sub interface type of said interface type:
   loading a class file of said software component;
   searching the class file for said sub interface type interface of said interface type; and
   if said sub interface type of said interface type is on the class file, displaying its name on said graphical user interface.

17. A computing system comprising:
   program code disposed on a computer readable medium, said program capable of being processed by said computing system to perform a method of creating a reference with the help of a graphical user interface, the method comprising:
   displaying a window having a first item, said first item representing a part of a software application program, said part being one of the following:
   a first software component;
   a page;
   a servlet;
   in response to a user selecting a first feature on said graphical user interface that expressly identifies a particular type of software component interface, displaying a second window containing features that pertain to a reference to be created, said reference to be directed from said part to a second software component through an interface of said expressly identified type;
   in response to said user identifying through at least one of said features a particular type of software component for said second software component, searching through deployment descriptors contained in an archive file to identify software components of said software component type and displaying said identified software components on said graphical user interface; and, after said user selects said second software component from amongst said identified and displayed software components, automatically creating said reference.

18. The computing system of claim 17 wherein said identified and displayed software components are displayed through a pull-down menu.

19. The computing system of claim 17 wherein said part and said software component are stored on a single container.

20. The computing system of claim 19, wherein said particular software component interface is a local interface.

21. The computing system of claim 9 wherein said part is stored on a first container, and said software component is stored on a second container.

22. The computing system of claim 21, wherein said particular type of software component interface is a remote interface.

23. The computing system of claim 22, wherein said part and said second software component are both Java beans.

24. The computing system of claim 17 further comprising after said user selects said second software component, in response to said user identifying a sub interface type of said interface type:

loading a class file of said software component;

searching the class file for a said sub interface type interface of said interface type; and if said sub interface type of said interface type is on the class file, displaying its name on said graphical user interface.

* * * * *